(12) United States Patent
Coleman et al.

(10) Patent No.: US 6,205,775 B1
(45) Date of Patent: Mar. 27, 2001

(54) EXHAUST GAS RECIRCULATION CONTROL SYSTEM

(75) Inventors: Gerald N. Coleman; Keith E. Lawrence, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/273,786

(22) Filed: Mar. 22, 1999

(51) Int. Cl.⁷ .................................................. F02M 25/06
(52) U.S. Cl. ................................ 60/278; 60/280; 60/298; 60/605.2
(58) Field of Search .......................... 60/278, 280, 298, 60/605.2

(56) References Cited

U.S. PATENT DOCUMENTS

| | | |
|---|---|---|
| 3,149,454 | 9/1964 | Hahn . |
| 3,712,280 | 1/1973 | Brille et al. . |
| 4,048,968 | 9/1977 | Aoyama . |
| 4,231,225 | 11/1980 | Aya . |
| 4,702,218 | 10/1987 | Yoshioka et al. . |
| 4,738,110 | 4/1988 | Tateno . |
| 4,903,488 | 2/1990 | Shibata . |
| 5,203,311 | 4/1993 | Hitomi et al. . |
| 5,205,265 * | 4/1993 | Kashiyama et al. ................. 123/570 |
| 5,425,239 | 6/1995 | Gobert . |
| 5,611,203 * | 3/1997 | Henderson et al. ................ 60/605.2 |
| 5,617,726 * | 4/1997 | Sheridan et al. .................... 60/605.2 |
| 5,771,868 | 6/1998 | Khair . |
| 5,802,846 * | 9/1998 | Bailey ..................................... 60/278 |
| 5,803,027 * | 9/1998 | Bell .................................... 123/65 BA |
| 5,927,075 * | 7/1999 | Khair ................................. 60/605.2 |
| 5,937,650 * | 8/1999 | Arnold ............................... 60/605.2 |
| 5,974,802 * | 11/1999 | Blake ................................ 60/605.2 |
| 6,003,315 * | 12/1999 | Bailey ............................... 60/605.2 |
| 6,038,860 * | 3/2000 | Bailey ............................... 60/605.2 |
| 6,062,026 * | 5/2000 | Woollenweber et al. ........... 60/605.2 |

* cited by examiner

Primary Examiner—Thomas Denion
Assistant Examiner—Thai-Ba Trieu
(74) Attorney, Agent, or Firm—Larry G. Cain

(57) ABSTRACT

Past exhaust emission control systems fail to utilize exhaust gas recirculation during all operating parameters of an engine. The present exhaust gas recirculation system reduces the emissions emitted from an engine during all operating parameters of the engine. The engine includes a cylinder, a rotatable crankshaft and a turbocharger defining a compressor section compressing a flow of intake air to a first preestablished pressure and being driven by a flow of exhaust gas having a first preestablished pressure. The exhaust gas recirculation system is comprised of a portion of the flow of exhaust gas being recirculated to the cylinder and forming a flow of recirculated exhaust gas. The flow of recirculated exhaust gas is cooled. The flow of recirculated exhaust gas is compressed to a second preestablished pressure being at least equal to the first preestablished pressure of the intake air. And, a quantity of the flow of recirculated exhaust gas is controlled depending on the operating parameter of the engine.

15 Claims, 3 Drawing Sheets

EXHAUST GAS RECIRCULATION CONTROL SYSTEM

TECHNICAL FIELD

This invention relates generally to an engine and more particularly to a reduction of exhaust emissions.

BACKGROUND ART

The use of fossil fuel as the combustible fuel in engines results in the combustion products of carbon monoxide, carbon dioxide, water vapor, smoke and particulate, unburned hydrocarbons, nitrogen oxides and sulfur oxides. Of these above products carbon dioxide and water vapor are considered normal and unobjectionable. In most applications, governmental imposed regulations are restricting the amount of pollutants being emitted in the exhaust gases.

In the past, NOx emissions have been reduced by reducing the intake manifold temperature, retarding the injection timing, and modifying the injection rate shape. And, the adverse effects on fuel consumption, particulate emissions engine performance have largely been alleviated through improvements in the basic engine design and fuel selection. For example, at the present time smoke and particulates has normally been controlled by design modifications in the combustion chamber and injection pressure, and particulates are normally controlled by traps and filters, and sulfur oxides are normally controlled by the selection of fuels being low in total sulfur. This leaves carbon monoxide, unburned hydrocarbons and nitrogen oxides as the emission constituents of primary concern in the exhaust gas being emitted from the engine.

Many systems have been developed for recycling a portion of the exhaust gas through the engine thereby reducing the emission of these constituents into the atmosphere. The recirculation of a portion of exhaust gas is used to reduce Nox pollution emitted to the atmosphere. In a naturally aspirated engine this process is relative simple. But, with a turbocharged engine, the recirculation of a portion of the exhaust gas into the intake air becomes more complex because the intake pressure may be higher than the exhaust pressure during many operating conditions. In many of such past system a volume of the exhaust gas from the engine was redirected to the intake air of the engine through the turbocharger and/or an aftercooler and to the engine. Such systems caused the premature plugging of aftercooler cores and malfunctioning of the systems. Additionally, with such recirculation system deterioration of the exhaust flow was caused by deposit buildup.

Various approaches have been used to address the adverse pressure gradient issue. For example, throttling valves have been installed in the air inlet, back pressure valves in the exhaust gas, intake manifold venturi tubes, etc. to provide sufficient pressure drop to get the exhaust gas to flow to the intake air. Although this provides the necessary pressure drop to functionally operate an exhaust gas recirculation system several disadvantages, such as, fuel consumption, emissions, and/or performance occur.

The present invention is directed to overcoming one or more of the problems as set forth above.

DISCLOSURE OF THE INVENTION

In one aspect of the invention a system for controlling emissions from an engine is disclosed. The engine defines a plurality of operating parameters, has a rotatable crankshaft (20) through which an engine speed can be defined and a plurality of cylinders being defined as a part of the engine. The system for controlling emissions is comprised of an exhaust gas recirculation system. The exhaust gas recirculation system is comprised of a flow of intake air entering a respective one of the plurality cylinders. The intake air is pressurized to a preestablished pressure. A supply of combustible fuel enters the respective one of the plurality of cylinders. A combustion process within the respective one of the plurality of cylinders defines a flow of exhaust gas having a preestablished pressure being less that the preestablished pressure of the intake air during at least a portion of the engine operating parameters. A portion of the exhaust gas is circulated to the intake air and defines a flow of recirculated exhaust gas. The flow of recirculated exhaust gas is cooled prior to being pressurized to a second preestablished level. The pressurization of the flow of recirculated exhaust gas to the second preestablished level is at least equal to the preestablished pressure of the intake air. And, the flow of recirculated exhaust gas is controlled to vary a quantity of recirculated exhaust gas depending on one of the plurality of operating parameters of the engine.

In another aspect of the invention a method of reducing emissions from an engine is disclosed. The engine has a flow of intake air being at a preestablished pressure and a flow of exhaust gas being at a preestablished pressure being less than the preestablished pressure of the intake air. And, a portion of the flow of exhaust gas (40) being recirculated into the flow of intake air. The method of reducing exhaust emission is comprised of the following steps: increasing the preestablished pressure of the recirculated portion of the flow of exhaust gas to a second preestablished pressure being at least equal to the preestablished pressure of the intake air; monitoring an operating parameter of the engine; and controlling the recirculated portion of the flow of exhaust gas being recirculated to the intake air depending on the operating parameter of the engine.

BEST MODE FOR CARRYING OUT THE INVENTION

Figure 1:
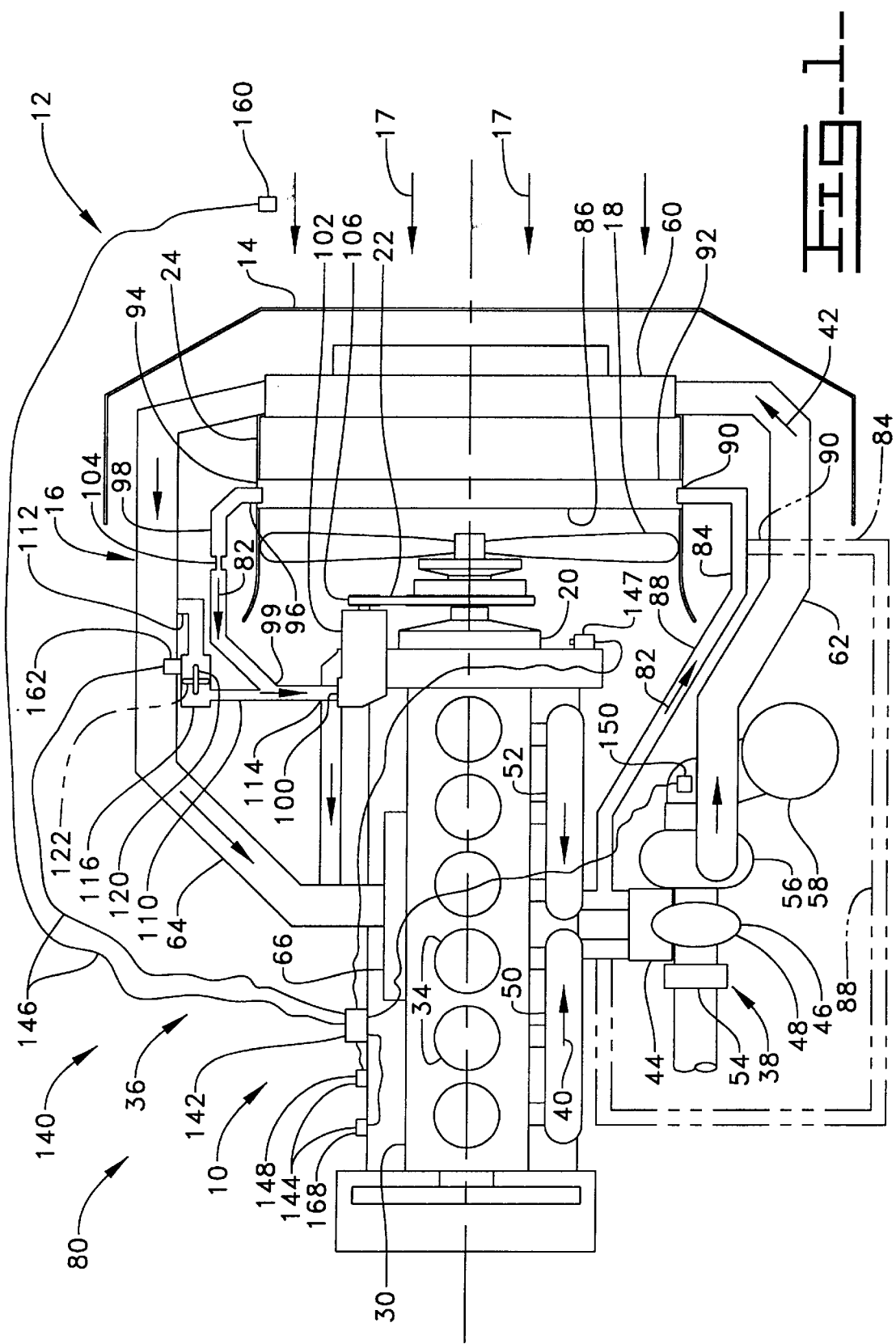
FIG. 1 is a schematic view of an engine embodying an exhaust gas recirculation system.

Referring to FIG. 1, an engine 10 is operatively positioned in a truck chassis 12, not shown in its entirety. The truck chassis 12 defines a frontal portion 14 and has the engine 10 removably attached to the truck chassis 12 in a conventional manner. A conventional cooling system 16 being cooled by ambient air, indicated by arrow 17, has a part thereof attached to the truck chassis 12. The cooling system 16, in this application, includes a fan 18 being attached to the engine 12 and being driven by a crankshaft 20 of the engine 10. The fan 18 is operatively driven by a belt 22 in a conventional manner. However, as an alternative, the fan could be driven by a motor and could be remotely attached to the chassis 12 or in other conventional manners without changing the essence of the invention. A radiator 24 is mounted in the truck chassis 12 and is interposed the fan 18 and the frontal portion 14. The radiator 24 operatively cools the engine 10 in a conventional manner.

The engine 10 includes a block 30 having a plurality of cylinder 34 therein. For example, an inline-6 cylinder is shown; however, as an alternative an inline-4 of a V configuration could be used without changing the essence of the invention. The engine 10 includes an air intake system 36 and an exhaust system 38. A flow of exhaust gas designated by the arrows 40 exits each of the respective plurality of cylinders 34 at a first preestablished pressure after a combustion process within a respective one of the plurality of cylinders 34. A flow of intake air designated by the arrows 42 enters each of the respective plurality of cylinders 34 through the air intake system 36 as will be defined later.

The exhaust system 38 includes an exhaust manifold 44 being attached to the block 12 and has the flow of exhaust gas 40 exits the plurality of cylinders 34 of the engine 10 passing therethrough. A turbocharger 46 is a part of the exhaust system 38 and is attached to the engine 10, as will be explained further. A turbine section 48 is operatively connected to and driven by the flow of exhaust gas 40 from the combustion process within the plurality of cylinders 34. For example, in this application, a first exhaust manifold portion 50 is connected to a first set of three cylinders and a second set of three cylinders 34 are connected to a second exhaust manifold portion 52. The turbine section 48 is connected to each of the first exhaust manifold portion 50 and the second exhaust manifold portion 52. The flow of exhaust gas 40 exits an exhaust opening 54 in the turbine section 48 and passes to the atmosphere. The turbocharger 46 further includes a compressor section 56 being driven by the turbine section 48 in a conventional manner.

The air intake system 36 is operatively connected to the compressor section 56 of the turbocharger 46 in a conventional manner. The flow of intake air 42 is communicated from the atmosphere through a filter 58 to the compressor section 56 of the turbocharger 46 in a convention manner. The compressor section 56 pressurizes the intake air 42 to a first preestablished pressure level being above a pressure level of the exhaust gas 40. Other conventional system could be use to increase the pressure of the intake air 42 without changing the jest of the invention. The intake air 42 is communicated from the compressor section 56 through an aftercooler 60 by a first conduit 62. In this application, the aftercooler 60 is an air to air aftercooler being operatively positioned between the radiator 24 and the frontal portion 14. From the aftercooler 60, the intake air 42 passes through a second conduit 64 and operatively enters the respective one of the plurality of cylinders 34 through an intake manifold 66.

Figure 2:
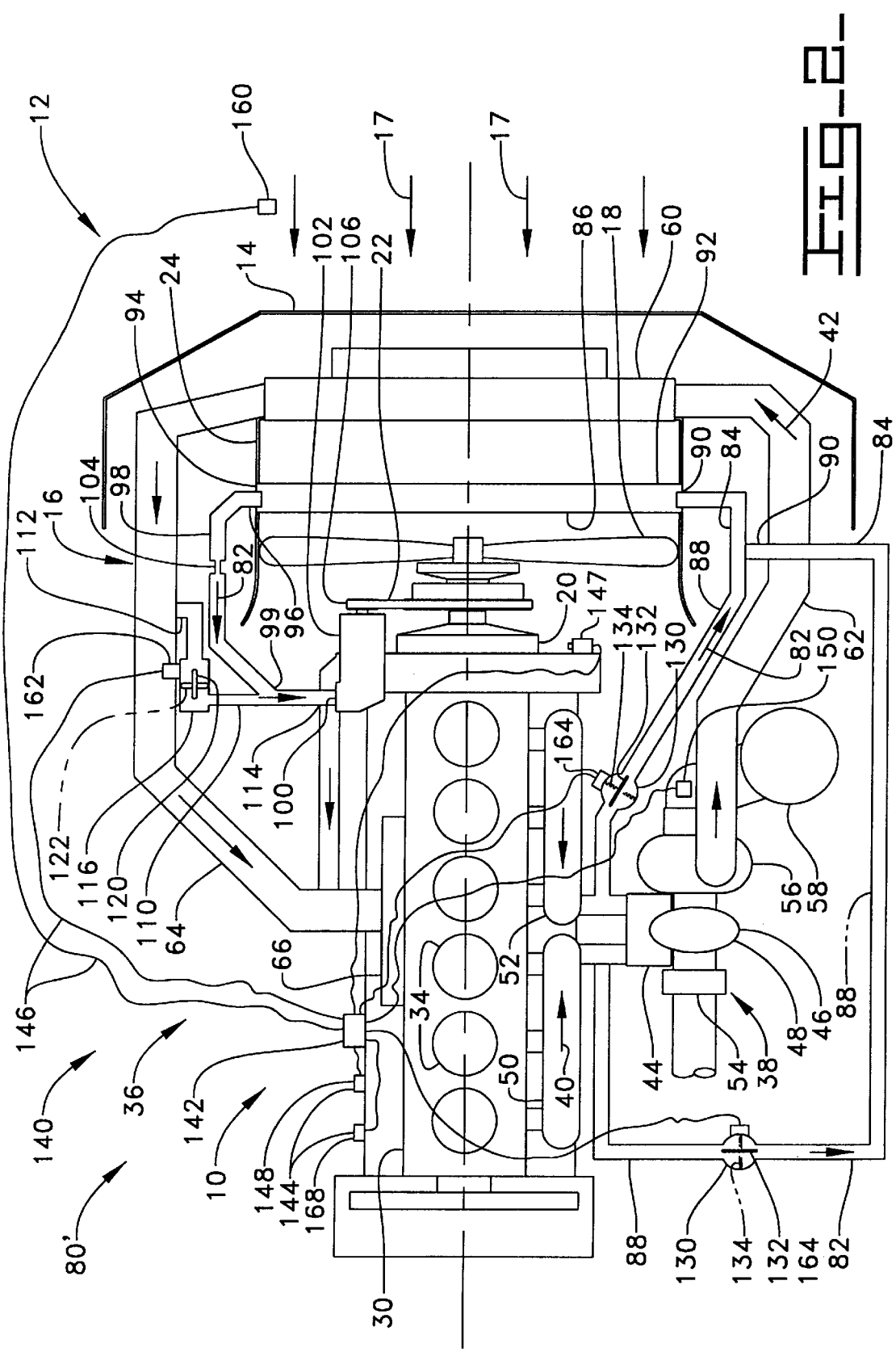
FIG. 2 is a schematic view of an engine embodying an additional exhaust gas recirculation system.

An exhaust gas recirculation system 80 is operatively attached to the engine 10. A portion of the exhaust gas 40 is recirculated to the plurality of cylinders 34. The portion of the exhaust gas 40 to be recirculated is designated by arrows 82, exhaust gas recirculation. The exhaust gas recirculation system 80 includes a supply line 84 being operatively connected between the flow of exhaust gas 40 and an exhaust gas recirculation cooler 86. In this application, the supply line 84 has a first end portion 88 attached to or near the intersection of the first exhaust manifold portion 50 and the second exhaust manifold portion 52 or the exhaust manifold 44. A second end portion 90 of the supply line 84 is attached to an inlet end portion 92 of the exhaust gas recirculation cooler 86. An outlet end portion 94 of the exhaust gas recirculation cooler 86 has a first end portion 96 of a first tube 98 attached thereto. A second end portion 99 of the first tube 98 is attached to an inlet portion 100 of a blower 102. Within the, blower 102, which in this application is a positive displacement pump 102, the exhaust gas recirculation 82 is pressurized to a second preestablished pressure being at least equal to that of the first preestablished pressure of the intake air 40. As best shown in FIGS. 1 and 2, interposed the first end portion 96 and the second end portion 99 of the first tube 98 is an orifice 104. The orifice 104 has a preestablished configuration and size to produce a preselected pressure drop.

The blower 102 is attached to the engine 10 in a conventional manner and is driven by the engine 10 crankshaft 20 by a conventional belt system 106. As stated earlier, in this application, the blower 102 is of a positive displacement configuration but as an alternative could be of other configuration, such as a non-positive displacement pump without changing the essence of the invention. The blower 102 is driven at a fixed speed ratio as compared to an engine 10 speed. For example, the engine 10 operating speed range is between about 1,000 RPM (revolutions per minute) and 2,500 RPM and the respective blower 102 speed range is between about 5,000 RPM and 10,000 RPM. Thus, the blower 102 speed is about 5 times the engine 10 speed. The blower 102 can be driven off either the engine crankshaft 20 or the engine mounted cooling fan 18.

In one alternative, as best shown in FIG. 1, the exhaust gas recirculation system 80 further includes a second tube 110 being interposed the second conduit 64 and the inlet portion 100 of the blower 102. A first end portion 112 of the second tube 110 is attached to the second conduit 64 and a second end portion 114 of the second tube 110 is attached to the inlet portion 100 of the blower 102. In this application, the second end portion 99 of the first tube 98 is attached to the second tube 110 prior to the position where the second end portion 114 of the second tube 110 is attached to the inlet portion 100 of the blower 102. A mixing valve 116 is located in the second tube 110. For example, the mixing valve 116 is positioned between the first end portion 112 of the second tube 110 and the intersection of the first tube 98 with the second tube 110. The mixing valve 116 is movable between an open position 120 and a closed position 122, shown in phantom, and varies the area through which the intake air 42 will flow before being mixed with the exhaust gas recirculation 82 to be recirculated. The mixing valve 116 is infinitely movable between the open position 120 and the closed position 122.

In another alternative, an option for use with the exhaust gas recirculation system 80 includes an on-off valve 130 can be located in the supply line 84 as shown in FIG. 2. And, the on-off valve 130 is positioned closer to the first end portion 88 of the supply line 84 than to the second end portion 90 of the supply line 84. The on-off valve 130 is movable between an open position 132 and a closed position 134, shown in phantom.

In another alternative, best shown in FIG. 2, an exhaust gas recirculation system 80 is shown. The exhaust gas recirculation system 80 is operatively attached to the engine 10. The exhaust gas recirculation system 80 includes a pair of supply lines 84 being operatively connected between the flow of exhaust gas 40 and the exhaust gas recirculation cooler 86. The flow of exhaust gas to be recirculated, designated by arrow 82, passes therethrough. The cooling of the exhaust gas recirculation cooler 86 can be of any convention means such as engine 10 jacket water cooling, air to air or an external cooling media. Each of the pair of supply lines 84 has a first end portion 88 attached to the first exhaust manifold portion 50 and the second exhaust manifold portion 52 respectively. The attachment is at a position spaced at a predetermined distance from the intersection of the first exhaust manifold 50 and the second exhaust manifold portion 52 of the exhaust manifold 44. A second end portion 90 of each of the supply lines 84 is attached to the inlet end portion 92 of the exhaust gas recirculation cooler 86. The outlet end portion 94 of the exhaust gas recirculation cooler 86 has the first end portion 96 of the first tube 98 attached thereto. The second end portion 99 of the first tube 98 is attached to the inlet portion 100 of the positive displacement pump 102. Within the positive displacement pump 102, the exhaust gas recirculation 82 from each of the first exhaust manifold 50 and the second exhaust manifold 52 is pressurized to the second preestablished pressure being at least equal to the first preestablished pressure of the intake air 42. Interposed the first end portion 88 and the second end portion 90 of each of the supply line 84 is a control or on-off valve 130. The on-off valve 130 can be operable through a plurality of positions between an open position 132 and a closed position 134, shown in phantom, varying the area through which the exhaust gas recirculation 82 will flow. With the exhaust gas recirculation system 80 as shown in FIG. 2, it is desirable to use a single actuator to control the position of the on-off valve 130. The single actuator will control the position of the on-off valve 130 in each of the pair of supply lines 84 from the respective first exhaust manifold 50 and the second exhaust manifold 52.

Figure 3:
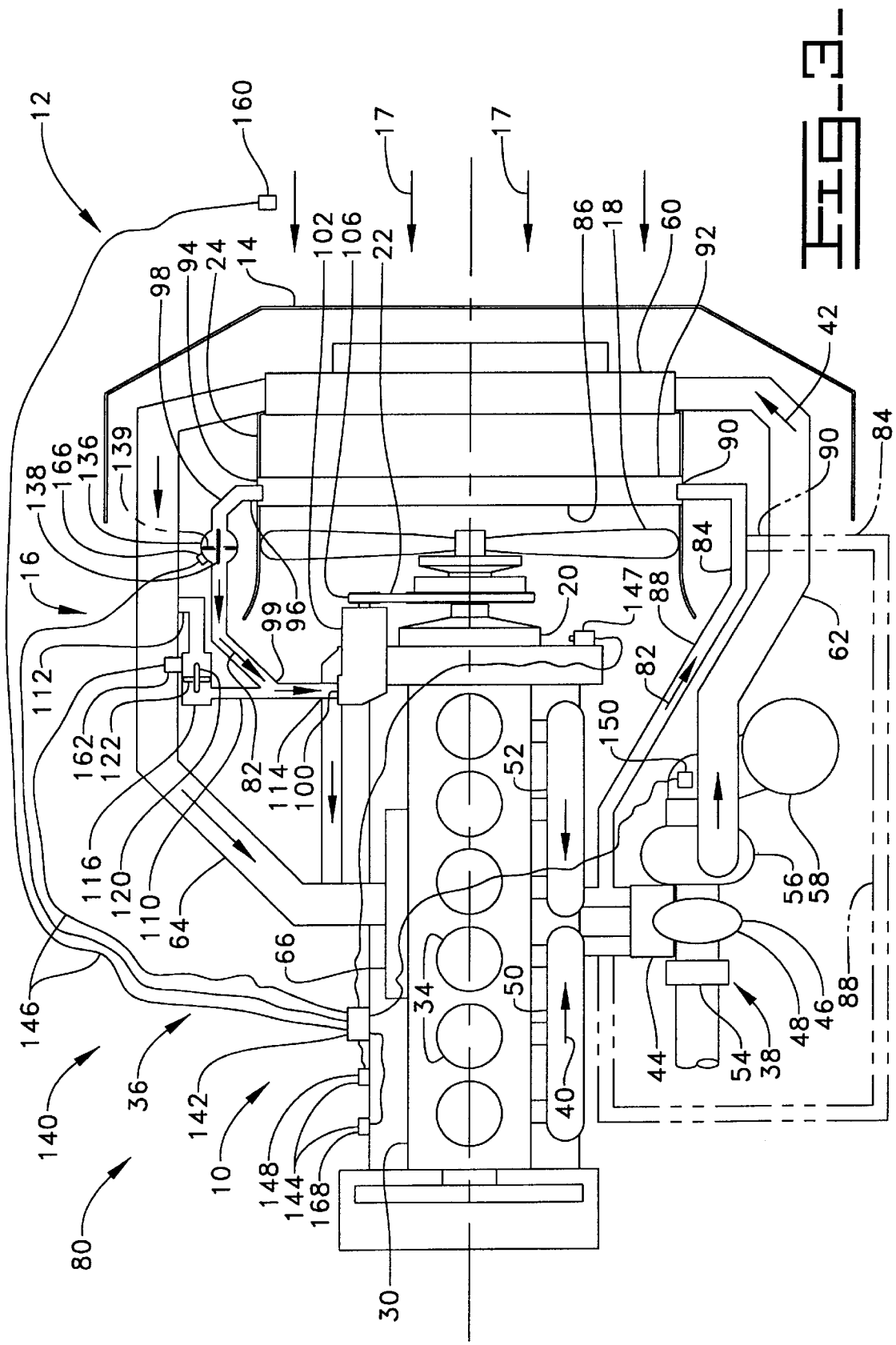
FIG. 3 is a schematic view of an engine embodying an additional exhaust gas recirculation system.

Additionally, as another option shown in FIG. 3, the orifice 104 has been replaced by a proportional valve 136. With the proportional valve 136 being infinitely variable between the open position 138 and the closed position 139 the quantity of recirculated exhaust gas 82 is controlled between a maximum quantity at the open position 138 to a minimum quantity at the closed position 139.

A control system 140 operatively monitors engine 10 operating parameters and depending on the parameters of the engine 10 varies the position of the mixing valve 116 and the optional on-off valve 130 if used. For example, a controller or computer 142 is used to receive input from a plurality of sensors 144. In this application, a plurality of wires 146 are used to transfer a signal, not shown, from each of the plurality of sensors 144 to the computer 142. Within the computer 142, the signals are stored, interpolated, analyzed and used to define the plurality of operating parameters of the engine 10. Some of the plurality of sensors 144 used are as follows. A speed sensor 147 is attached to the block 30 and monitors the rotational speed of the crankshaft 20. A temperature sensor 148 is positioned in the block 30 and monitors coolant temperature, an intake air sensor 150 is operatively positioned in the flow of intake air 40 and has the capabilities to monitor pressure, temperature and mass flow rate. As an alternative several air sensors 150 can be used. For example, one to monitor mass air flow, another to monitor pressure and another to monitor temperature. Ambient air sensor 160 is attached near the frontal area and monitors the temperature and pressure (altitude) of the cooling air 17. Additionally, as shown in FIG. 1, a first position controller 162 is operatively connected to the mixing valve 116 and monitors and controls the position of the mixing valve 116 between the open positions 120 and the closed position 122. As further shown in FIG. 2, a second position controller 164 is operatively connected to the on-off valve 130 and monitors and controls the position of the on-off valve 130 between the open positions 132 and the closed position 134. And, as further shown in FIG. 3, a third position controller 166 is operatively connected to the proportional valve 136 and monitors the infinitely variable position of the proportional valve between the open position 138 and the closed position 139.

A conventional fuel system, not shown, is used with the engine 10 and a sensor 168 is used to monitor parameters of the fuel system such as quantity of fuel, pressure and injection timing.

Industrial Applicability

In use, the engine 10 is started. Fuel is supplied to each of the plurality of cylinders 34. Intake air 42 is supplied to the engine 10. For example, intake air 42 enters the compressor section 48 and is compressed increasing in pressure and temperature. From the compressor section 50, intake air 42 passes through the aftercooler, is cooled becoming more dense and enters into the respective one of the plurality of cylinders 34. Within the plurality of cylinders 34 the intake air 42 and the fuel are combusted. After combustion, the flow of exhaust gas 40 enters one of the first exhaust manifold portion 50 or the second exhaust manifold portion 52 of the exhaust manifold 44. The flow of exhaust gas 40 enters the turbine section 48 of the turbocharger 46 and drives the compressor section 56. After flowing through the turbocharger 46 the exhaust gas 40 exits to the atmosphere.

With the control system 140 operational, exhaust gas recirculation 82 is used with the engine 10. Depending on the operating parameter of the engine 10, the position of the on-off valve 130, if used, is varied. The controller 142 receives input from the plurality of sensors 144, interprets these inputs and determines the operating parameter of the engine 10 and varies the position of the on-off valve 130. During operation of the engine 10, the ambient air sensor 160 sends a signal to the controller 142 representative of the ambient temperature and pressure or altitude. For example, on a hot day the temperature is higher than on a cold day where the temperature is low. And, at a low altitude, below sea level, the pressure is higher than at a high altitude, in the mountains, where the pressure is low. Thus, the mass air flow as measured by the air sensor 150 to the intake manifold 66 will vary depending on the environment. With a wastegated turbocharger, the position of the wastegate will be varied conventionally to compensate for the temperature and the pressure. Additionally, the speed sensor 147 monitors the speed of the engine 10 and sends a corresponding signal to the controller 142. The temperature sensor 148 monitors the operating temperature of the engine 10 and sends a corresponding signal to the controller 142. And, the sensor 168 monitors the parameters of the fuel system, such as quantity of fuel and injection timing.

As shown in FIG. 1, with the signals stored in the controller 142, the operating parameters of the engine 10 are monitored. And, depending on the operating parameter of the engine 10 the position of the mixing valve 116 is varied between the open position 120 and the closed position 122. For example, with the engine 10 parameter being at high load and low speed, the mixing valve 116 is positioned by the position controller 162 at or near the open position 120. And, with the engine 10 parameter being at low load and high speed, the mixing valve 116 is positioned by the position controller 162 at or near the closed position 122.

As shown in FIG. 2, with the signals stored in the controller 142, the operating parameters of the engine 10 are monitored. And, depending on the operating parameter of the engine 10 the position of each of the mixing valve 116 is varied between the open position 120 and the closed position 122. And, the on-off valve 130 is varied between the open position 132 and the closed position 134. For example, with the engine 10 parameter being at high load and low speed, the mixing valve 116 is positioned by the position controller 162 at or near the open position 120. And, the on-off valve 130 is positioned by the position controller 164 at or near the closed position 134. And, with the engine 10 parameter being at low load and high speed, the mixing valve 116 is positioned by the position controller 162 at or near the closed position 122 and the on-off valve 130 is positioned by the position controller 164 at or near the open position 132.

As shown in FIG. 3, with the signals in the controller 142, the operating parameters of the engine 10 are monitored. And, depending on the operating parameter of the engine 10 the position of each of the mixing valve 116 is varied between the open position 120 and the closed position 122. And, the proportional valve 136 is varied between the open position 138 and the closed position 139. For example, with the engine 10 parameter being at high load and low speed, the mixing valve 116 is positioned by the position controller 162 at or near the open position 120 and the proportional valve 136 is positioned by the controller 166 at or near the closed position 139. And, with the engine 10 parameter being at low load and high speed, the mixing valve 116 is positioned by the position controller 162 at or near the closed position 122 and the proportional valve 136 is positioned by the position controller 166 at or near the open position 138.

Thus, under the various operating parameters of the engine 10 the control system 140 varies the exhaust gas recirculation 82 to the engine 10. For example, the control system 140 monitor the changing inputs signals generated by the plurality of sensors 144. The signals are stored within the controller 142. The controller 142 interprets the various signals and positions the appropriate one or ones of the mixing valve 116, on-off valve 130 and proportional valve 136 at or near the respective open position 120,132,138. Depending on the environmental conditions, operating parameters of the engine 10 the emissions of the engine 10 are compensated for and reduced to an acceptable level.

Other aspects, objects and advantages of this invention can be obtained from a sturdy of the drawings, the disclosure and the appended claims.

What is claimed is:

1. A method of reducing emissions from an engine, having a flow of intake air being at a preestablished pressure, a flow of exhaust gas being at a preestablished pressure being less than said preestablished pressure of said intake air and recirculating a portion of said flow of exhaust gas into said flow of intake air; said method of reducing exhaust emission comprising the steps of:

increasing said preestablished pressure of said recirculating portion of said flow of exhaust gas to a second preestablished pressure being at least equal to said preestablished pressure of said intake air and said second preestablished pressure includes said recirculating portion being cooled and being increased by using a blower, said blower being driven at a speed being greater than a speed of said engine;

monitoring an operating parameter of said engine; and controlling said recirculating portion of said flow of exhaust gas being recirculated to said intake air depending on said operating parameter of said engine.

2. The method of reducing emissions from an engine of claim 1 wherein said step of controlling said portion of said flow of exhaust gas being recirculated to said intake air being near a maximum quantity with said operating parameter of said engine being a high load and a low speed operating parameter.

3. The method of reducing emissions from an engine of claim 1 wherein said step of controlling said portion of said flow of exhaust gas being recirculated to said intake air being near a minimum quantity with said operating parameter of said engine being a low load and a high speed operating parameter.

4. The method of reducing emissions from an engine of claim 1 wherein said step of monitoring an operating parameter of said engine being sensing a parameter of said engine.

5. The method of reducing emissions from an engine of claim 4 wherein said step of monitoring an operating parameter of said engine being monitoring an ambient air mass flow.

6. The method of reducing emissions from an engine of claim 4 wherein said step of monitoring an operating parameter of said engine being monitoring an engine operating temperature.

7. The method of reducing emissions from an engine of claim 4 wherein said step of monitoring an operating parameter of said engine being monitoring an engine operating speed.

8. The method of reducing emissions from an engine of claim 4 wherein said step of monitoring an operating parameter of said engine being monitoring a quantity of fuel being supplied to said engine.

9. A method of reducing emissions from an engine, having a flow of intake air being at a preestablished pressure, a flow of exhaust gas being at a preestablished pressure being less than said preestablished pressure of said intake air and recirculating a portion of said flow of exhaust gas into said flow of intake air; said method of reducing exhaust emission comprising the steps of:

increasing said preestablished pressure of said recirculating portion of said flow of exhaust gas to a second preestablished pressure being at least equal to said preestablished pressure of said intake air using a blower being driven by said engine at a speed being greater than a speed of said engine;

monitoring an operating parameter of said engine; and controlling said recirculating portion of said flow of exhaust gas being recirculated to said intake air depending on said operating parameter of said engine.

10. The method of reducing emissions from an engine of claim 9 wherein said step of controlling said portion of said flow of exhaust gas being recirculated to said intake air being near a maximum quantity with said operating parameter of said engine being a high load and a low speed operating parameter.

11. The method of reducing emissions from an engine of claim 9 wherein said step of monitoring an operating parameter of said engine being sensing a parameter of said engine.

12. The method of reducing emissions from an engine of claim 11 wherein said step of monitoring an operating parameter of said engine being monitoring an ambient air mass flow.

13. The method of reducing emissions from an engine of claim 11 wherein said step of monitoring an operating parameter of said engine being monitoring an engine operating speed.

14. The method of reducing emissions from an engine of claim 11 wherein said step of monitoring an operating parameter of said engine being monitoring a quantity of fuel being supplied to said engine.

15. The method of reducing emissions from an engine of claim 9 wherein said step of monitoring an operating parameter of said engine being monitoring an engine operating temperature.

* * * * *